(12) United States Patent
Makino (10) Patent No.: US 6,330,096 B1
(45) Date of Patent: Dec. 11, 2001

(54) LIGHT-BEAM SCANNING TYPE IMAGE READER

(75) Inventor: Kazuhiro Makino, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/676,488

(22) Filed: Oct. 2, 2000

(30) Foreign Application Priority Data

Sep. 30, 1999 (JP) .................................................. 11-280130

(51) Int. Cl.[7] .................................................. G02B 26/08
(52) U.S. Cl. ........................ 359/216; 358/481; 358/496
(58) Field of Search .................................. 359/201, 202, 359/216–219; 358/296, 474, 481, 496; 347/248–250, 261; 250/234–236

(56) References Cited

U.S. PATENT DOCUMENTS 4,924,321 * 5/1990 Miyagawa et al. .................. 359/216

5,109,297 * 4/1992 Izumi .................................. 359/216

* cited by examiner

Primary Examiner—James Phan
(74) Attorney, Agent, or Firm—Sughrue, Mion, Zinn Macpeak & Seas, PLLC (57) ABSTRACT

The number of pixels in a horizontal scanning direction and the number of pixels in a vertical scanning direction are computed by use of a calibration sheet. The cycle of a first clock pulse which is generated by a first clock generation section is computed by a clock-cycle computation section so that the computed number of horizontal pixels becomes equal to a desired number of horizontal pixels. Similarly, the cycle of a second clock pulse which is generated by a second clock generation section is computed by the clock-cycle computation section so that the computed number of vertical pixels becomes equal to a desired number of vertical pixels. The computed cycles of the first and second clock pulses are stored in a clock-cycle storage section. When reading a sheet from which an image is read out, a drive-clock control section controls the first and second clock generation sections, based on the stored clock cycles.

10 Claims, 5 Drawing Sheets

LIGHT-BEAM SCANNING TYPE IMAGE READER

BACKGROUND OF THE INVENTION

1. Field of the Invention

The present invention relates to a light-beam scanning type image reader, and more particularly to an improvement in the method of adjusting lengths across which a scan body is scanned or read.

2. Description of the Related Art

A light-beam scanning type image reader is known in which an image signal is obtained by scanning a light beam on a scan body recorded with an image and photoelectrically reading luminescent light emitted according to the recorded image.

As the light-beam scanning type image reader, a radiation image recording-reproducing system and an autoradiographic system have been proposed and already been put to practical use by the applicant of this application. These systems take advantage of the photostimulated luminescence (PSL) of a storage-type phosphor (stimulatable phosphor) in which the phosphor is irradiated with radiation (X-rays, α-rays, β-rays, γ-rays, electron rays, ultraviolet rays, etc.) and emits luminescent light according to the stored radiation energy when irradiated with excitation light such as visible light, etc. That is, by irradiating a radiation image, transmitted through a human body, etc., to a storage-type fluorescent sheet, or by exposing the tissue of a living organism, containing a drug labeled with a radioactive substance, to direct contact with the storage-type fluorescent sheet only for a predetermined time, the radiation image, such as the transmitted radiation image, the directly exposed image, etc., is temporarily stored and recorded on the storage-type fluorescent sheet. Then, excitation light, such as laser light, etc., is scanned on the storage-type fluorescent sheet to obtain photostimulated fluorescent light according to the radiation image, stored and recorded on the sheet. The obtained photostimulated fluorescent light is converted to an electrical image signal. Based on the image signal, the radiation image is output as a visible image to a recording material such as a photosensitive material, etc., or to a cathode-ray tube (CRT) display unit, etc.

In these light-beam scanning type readers, a light beam, reflected and deflected by a rotating polygon mirror, is scanned on a scan body in a horizontal scanning direction, and at least either the light beam or the scan body is scanned in a vertical scanning direction approximately perpendicular to the horizontal scanning direction. Through a combination of the horizontal scan and the vertical scan, the light beam is uniformly scanned on the scan body.

In the case where an image signal is read out from a scan body by the above-mentioned image reader, incidentally, image signals must be obtained at a fixed number of pixels from a scan body, if the scan body has a fixed form.

However, there are cases where fabricated image readers have a different number of pixels because of the cumulation of allowable fabrication errors, etc., of each component of the optical system, electrical system, mechanical system, etc., which constitute the image reader. Because of this, image signals cannot be always obtained at a fixed number of pixels from a fixed form of scan body. In addition, there are instances where a desired number of pixels vary with each user of the image reader. Thus, it is desired that these cases are flexibly handled.

SUMMARY OF THE INVENTION

The present invention has been made in view of the aforementioned circumstances. Accordingly, it is the primary object of the present invention to provide a light-beam scanning type image reader that is capable of readily adjusting the number of pixels which can be obtained from a scan body.

The light-beam scanning type image reader of the present invention employs a predetermined scan body (calibration sheet) to obtain the number of pixels in a horizontal scanning direction and the number of pixels in a vertical scanning direction, and adjusts either the number of drive-clock pulses for a rotating polygon mirror or the number of A/D sampling clock pulses so that the obtained number of horizontal pixels becomes equal to a desired number of horizontal pixels, and also adjusts the number of vertical scanning clock pulses for vertical scanning means so that the obtained number of vertical pixels becomes equal to a desired number of vertical pixels.

That is, a first light-beam scanning type image reader of the present invention comprises:

light-beam generation means for generating a light beam;

first clock generation means for generating a first clock pulse;

second clock generation means for generating a second clock pulse;

a rotating polygon mirror, which rotates at a speed of rotation based on the first clock pulse generated by the first clock generation means, for reflecting and deflecting the light beam so that the light beam is repeatedly scanned on a scan body in a horizontal scanning direction;

vertical scanning means for scanning at least either one of the light beam or the scan body with respect to the other in a vertical scanning direction approximately perpendicular to the horizontal scanning direction at a speed based on the second clock pulse generated by the second clock generation means;

photoelectric detection means for photoelectrically detecting in sequence luminescent light emitted from the scan body by scanning the light beam on the scan body;

sampling-clock generation means for generating a fixed analog-to-digital (A/D) sampling clock pulse;

analog-to-digital conversion means for converting analog signals, detected and obtained by the photoelectric detection means, to digital signals according to the A/D sampling clock pulse generated by the sampling-clock generation means;

clock-cycle computation means for computing a cycle of the first clock pulse so that a number of the digital signals, obtained according to a horizontal length of a predetermined scan body, becomes equal to a first desired number of pixels, and for computing a cycle of the second clock pulse so that a number of the digital signals, obtained according to a vertical length of the predetermined scan body, becomes equal to a second desired number of pixels;

clock-cycle storage means for storing the cycle of the first clock pulse and the cycle of the second clock pulse computed by the clock-cycle computation means; and drive-clock control means for adjusting a cycle of the first clock pulse and a cycle of the second clock pulse, based on the cycle of the first clock pulse and the cycle of the second clock pulse stored in the clock-cycle storage means.

The predetermined scan body is, for example, a scan body of the same size as a scan body from which an image is read out, and can employ a test scan body to which radiation is uniformly irradiated, etc. The size of the predetermined scan body does not need to be exactly the same as the size of a scan body from which an image is read out. When the size ratio between the predetermined scan body and a scan body from which an image is read out is known, each clock pulse for a scan body from which an image is read out can be easily adjusted. Such a predetermined scan body does not necessarily need to be uniformly irradiated with radiation, and is sufficient if the lengths in the horizontal and vertical scanning directions can be computed based on an image signal read out. For example, it may be a scan body wherein only the circumferential edge portion is colored with high density so that a photoelectrically detected image signal can change sharply. This explanation for the predetermined scan body applies to the following description.

In a preferred form of the first light-beam scanning type image reader of the present invention, the first clock generation means is equipped with first reference-clock generation means for generating a first reference clock pulse which is higher in frequency than the first clock pulse, and a first frequency-dividing circuit, which has a variable frequency-dividing ratio, for dividing frequency of the first reference clock pulse so that the frequency of the first reference clock pulse becomes equal to the frequency of the first clock pulse. Also, the second clock generation means is equipped with second reference-clock generation means for generating a second reference clock pulse which is higher in frequency than the second clock pulse, and a second frequency-dividing circuit, which has a variable frequency-dividing ratio, for dividing frequency of the second reference clock pulse so that the frequency of the second reference clock pulse becomes equal to the frequency of the second clock pulse. Furthermore, the drive-clock control means adjusts the first clock pulse and the second clock pulse by adjusting the frequency-dividing ratios of the first frequency-dividing circuit and the second frequency-dividing circuit. The reason for this is that while adjusting the first or second clock pulse directly is undesirable from the viewpoint of precision management, adjustment of the frequency-dividing ratio is easy.

It is preferable that the clock-frequency computation means compute each of the numbers of digital signals corresponding to the horizontal and vertical lengths of the predetermined scan body, based on a value of the digital signal obtained. This is because the numbers of digital signals corresponding to the horizontal and vertical lengths of the predetermined scan body can be computed by simple construction making use of the photoelectric detection means originally equipped in the image reader.

For instance, assume a test scan body irradiated with uniform radiation is employed and that a light beam passes across the horizontal edge of the scan body when the differentiated value of the value of the digital signal obtained in the horizontal scanning direction is maximum (or minimum) and minimum (or maximum). By counting the number of pixels (number of digital signals) obtained during this interval, the numbers of digital signals corresponding to the horizontal and vertical lengths of the scan body can be computed.

In addition, a second light-beam scanning type image reader of the present invention comprises:

light-beam generation means for generating a light beam;

first clock generation means for generating a first clock pulse;

second clock generation means for generating a second clock pulse;

a rotating polygon mirror, which rotates at a speed of rotation based on the first clock pulse generated by the first clock generation means, for reflecting and deflecting the light beam so that the light beam is repeatedly scanned on a scan body in a horizontal scanning direction;

vertical scanning means for scanning at least either one of the light beam or the scan body with respect to the other in a vertical scanning direction approximately perpendicular to the horizontal scanning direction at a speed based on the second clock pulse generated by the second clock generation means;

photoelectric detection means for photoelectrically detecting in sequence luminescent light emitted from the scan body by scanning the light beam on the scan body;

sampling-clock generation means for generating an A/D sampling clock pulse;

analog-to-digital conversion means for converting analog signals, detected and obtained by the photoelectric detection means, to digital signals according to the A/D sampling clock pulse generated by the sampling-clock generation means;

clock-cycle computation means for computing a cycle of the A/D sampling clock pulse so that a number of the digital signals, obtained according to a horizontal length of a predetermined scan body, becomes equal to a first desired number of pixels, and for computing a cycle of the second clock pulse so that a number of the digital signals, obtained based on the A/D sampling clock pulse after the cycle has been adjusted according to a vertical length of the predetermined scan body, becomes equal to a second desired number of pixels;

clock-cycle storage means for storing the cycle of the A/D sampling clock pulse and the cycle of the second clock pulse computed by the clock-cycle computation means; and drive-clock control means for adjusting a cycle of the A/D sampling clock pulse and a cycle of the second clock pulse, based on the cycle of the A/D sampling clock pulse and the cycle of the second clock pulse stored in the clock-cycle storage means.

In a preferred form of the second light-beam scanning type image reader of the present invention, the sampling-clock generation means is equipped with first reference-clock generation means for generating a first reference clock pulse which is higher in frequency than the A/D sampling clock pulse, and a first frequency-dividing circuit, which has a variable frequency-dividing ratio, for dividing frequency of the first reference clock pulse so that the frequency of the first reference clock pulse becomes equal to the frequency of the A/D sampling clock pulse. Also, the second clock generation means is equipped with second reference-clock generation means for generating a second reference clock pulse which is higher in frequency than the second clock pulse, and a second frequency-dividing circuit, which has a variable frequency-dividing ratio, for dividing frequency of the second reference clock pulse so that the frequency of the second reference clock pulse becomes equal to the frequency of the second clock pulse. Furthermore, the drive-clock control means adjusts the A/D sampling clock pulse and the second clock pulse by adjusting the frequency-dividing ratios of the first frequency-dividing circuit and the second frequency-dividing circuit. This is because while it is undesirable to adjust the A/D sampling clock pulse or the second clock pulse directly from the viewpoint of precision management, adjustment of the frequency-dividing ratio is easy.

In another preferred form of the second light-beam scanning type image reader of the present invention, the sampling-clock generation means is equipped with a first frequency-dividing circuit, which has a variable frequency-dividing ratio, for dividing frequency of a clock pulse, generated when following rotation of the rotating polygon mirror, which is higher in frequency than the A/D sampling clock pulse, so that the frequency of the clock pulse becomes equal to the frequency of the A/D sampling clock pulse. The clock pulse, generated when following rotation of the rotating polygon mirror, which is higher in frequency than the A/D sampling clock pulse, is, for example, a pulse generated from a rotatable encoder provided to be coaxial with the rotational shaft of the rotating polygon mirror. The second clock generation means is equipped with second reference-clock generation means for generating a fixed second reference clock pulse which is higher in frequency than the second clock pulse, and a second frequency-dividing circuit, which has a variable frequency-dividing ratio, for dividing frequency of the second reference clock pulse so that the frequency of the second reference clock pulse becomes equal to the frequency of the second clock pulse. Moreover, the drive-clock control means adjusts the A/D sampling clock pulse and the second clock pulse by adjusting the frequency-dividing ratios of the first frequency-dividing circuit and the second frequency-dividing circuit.

In still another preferred form of the second light-beam scanning type image reader of the present invention, as with the first light-beam scanning type image reader, the clock-frequency computation means computes each of the numbers of digital signals corresponding to the horizontal and vertical lengths of the predetermined scan body, based on a value of the digital signal obtained. As previously stated, this is because the numbers of digital signals corresponding to the horizontal and vertical lengths of the predetermined scan body can be computed by a simple construction making use of the photoelectric detection means originally equipped in the image reader.

The light-beam scanning type image reader of the present invention first computes the number of pixels in a horizontal scanning direction and the number of pixels in a vertical scanning direction by use of the predetermined scan body such as a test scan body. Then, either the number of drive-clock pulses for the rotating polygon mirror or the number of A/D sampling clock pulses are computed by the clock-frequency computation means so that the obtained number of horizontal pixels becomes equal to a desired number of horizontal pixels. In addition, the number of vertical scanning clock pulses for the vertical scanning means are computed so that the obtained number of vertical pixels becomes equal to a desired number of vertical pixels. These numbers of clock pulses are stored in the clock-cycle storage means. Based on the stored numbers of clock pulses, the drive-clock control means adjusts either the number of drive-clock pulses for the rotating polygon mirror or the number of A/D sampling clock pulses, and also adjusts the number of vertical scanning clock pulses for the vertical scanning means. In this manner, image signals of a desired numbers of pixels in each of the horizontal and vertical scanning directions can be easily obtained.

The above and many other objects, features and advantages of the present invention will become manifest to those skilled in the art upon making reference to the following detailed description and accompanying drawings in which preferred embodiments incorporating the principle of the present invention are shown by way of illustrative example.

DESCRIPTION OF THE PREFERRED EMBODIMENTS

Figure 1:
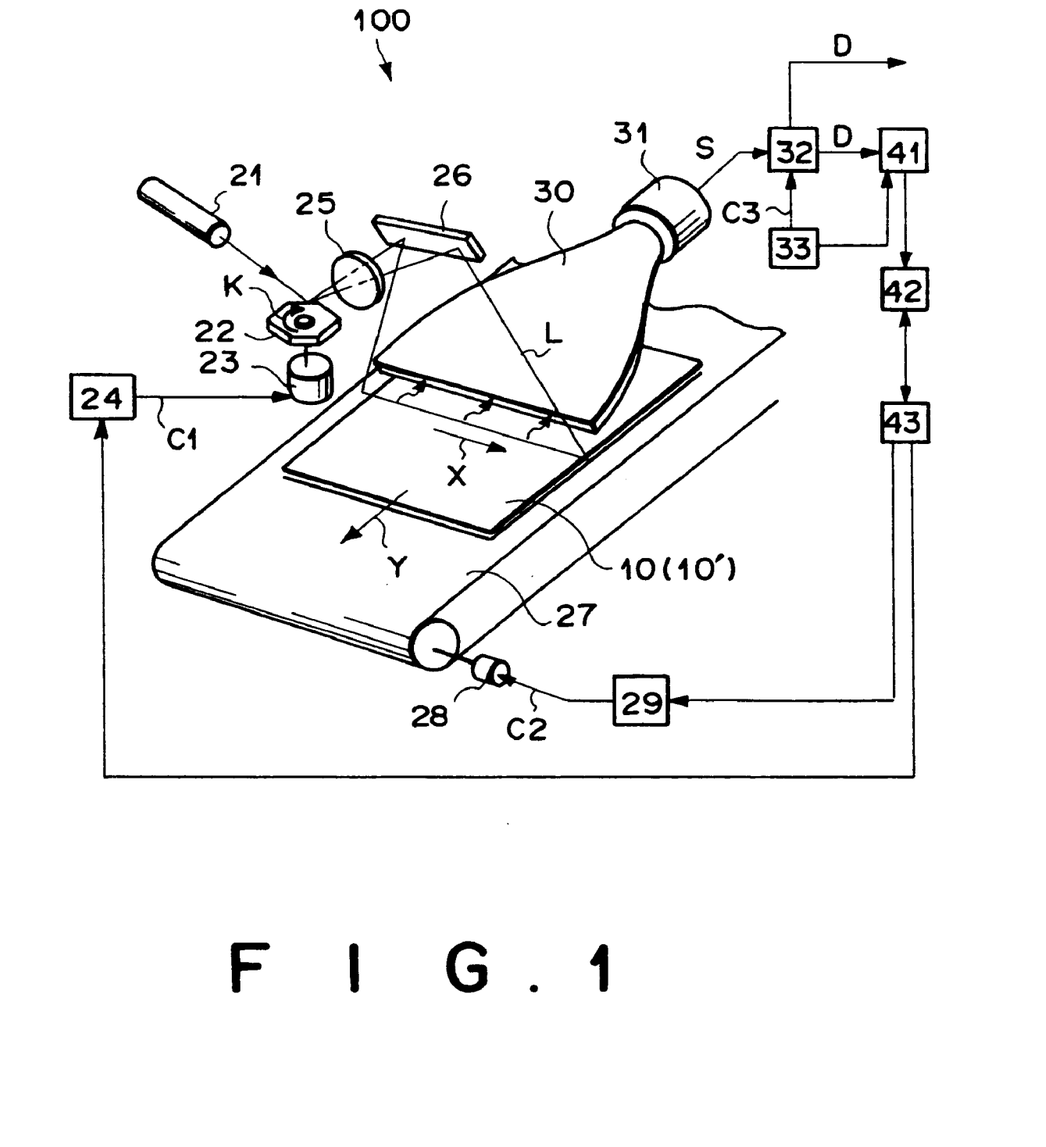
FIG. 1 is a schematic diagram showing an embodiment of a first light-beam scanning type image reader of the present invention.

Referring now in greater detail to the drawings and initially to FIG. 1, there is shown an embodiment of a first light-beam scanning type image reader 100 in accordance with the present invention. The light-beam scanning type image reader 100 comprises (1) a light source 21 for emitting a laser beam L; (2) first clock generation means 24 for generating a first clock pulse C1; (3) second clock generation means 29 for generating a second clock pulse C2; (4) a rotating polygon mirror 22 for reflecting and deflecting the laser beam L so that the laser beam L is repeatedly scanned on a storage-type fluorescent sheet 10 recorded with a radiation image in the direction of arrow X (horizontal scanning direction), by a horizontal scan motor 23 which rotates in the direction of arrow K at a speed of rotation based on the first clock pulse C1 generated by the first clock generation means 24; (5) an fθ lens 25 and a reflecting mirror 26 for horizontally scanning the laser beam L reflected and deflected by the rotating polygon mirror 22, on the sheet 10 at a constant speed; (6) a vertical scan motor 28 for moving a conveyor belt 27, on which the sheet 10 is placed, in a direction of arrow Y (vertical scanning direction) approximately perpendicular to the direction of arrow X (horizontal scanning direction) at a speed based on the second clock pulse C2 generated by the second clock generation means 29; (7) a photomultiplier (PMT) 31 for photoelectrically detecting photostimulated fluorescent light M emitted from the sheet 10 in accordance with the radiation image recorded on the sheet 10, by scanning the laser beam L on the sheet 10; (8) an optical guide 30 for sequentially guiding the photostimulated fluorescent light M emitted from the sheet 10, to the PMT 31; (9) sampling-clock generation means 33 for generating a fixed analog-to-digital (A/D) sampling clock pulse C3; (10) an A/D converter 32 for converting an image signal S, corresponding to the photostimulated fluorescent light M detected photoelectrically by the PMT 31, to a digital signal D in accordance with the sampling clock pulse C3 generated by the sampling-clock generation means 33; (11) clock-cycle computation means 41 for computing the cycle of the first clock pulse C1, generated by the first clock generation means 24, so that the number Nx of digital signals Dx obtained according to the length of a calibration sheet 10' in the horizontal scanning direction becomes equal to a desired number NxO of horizontal pixels, and for computing the cycle of the second clock pulse C2, generated by the second clock generation means 29, so that the number Ny of digital signals Dy obtained according to the length of the calibration sheet 10' in the vertical scanning direction becomes equal to a desired number Ny0 of vertical pixels; (12) clock-cycle storage means 42 for storing the cycles of the first and second clock pulses C1 and C2 computed by the clock-cycle computation means 41; and (13) drive-clock control means 43 for adjusting the cycle of the first clock pulse C1 generated by the first clock generation means 24 and the cycle of the second clock pulse C2 generated by the second clock generation means 29.

Figure 2:
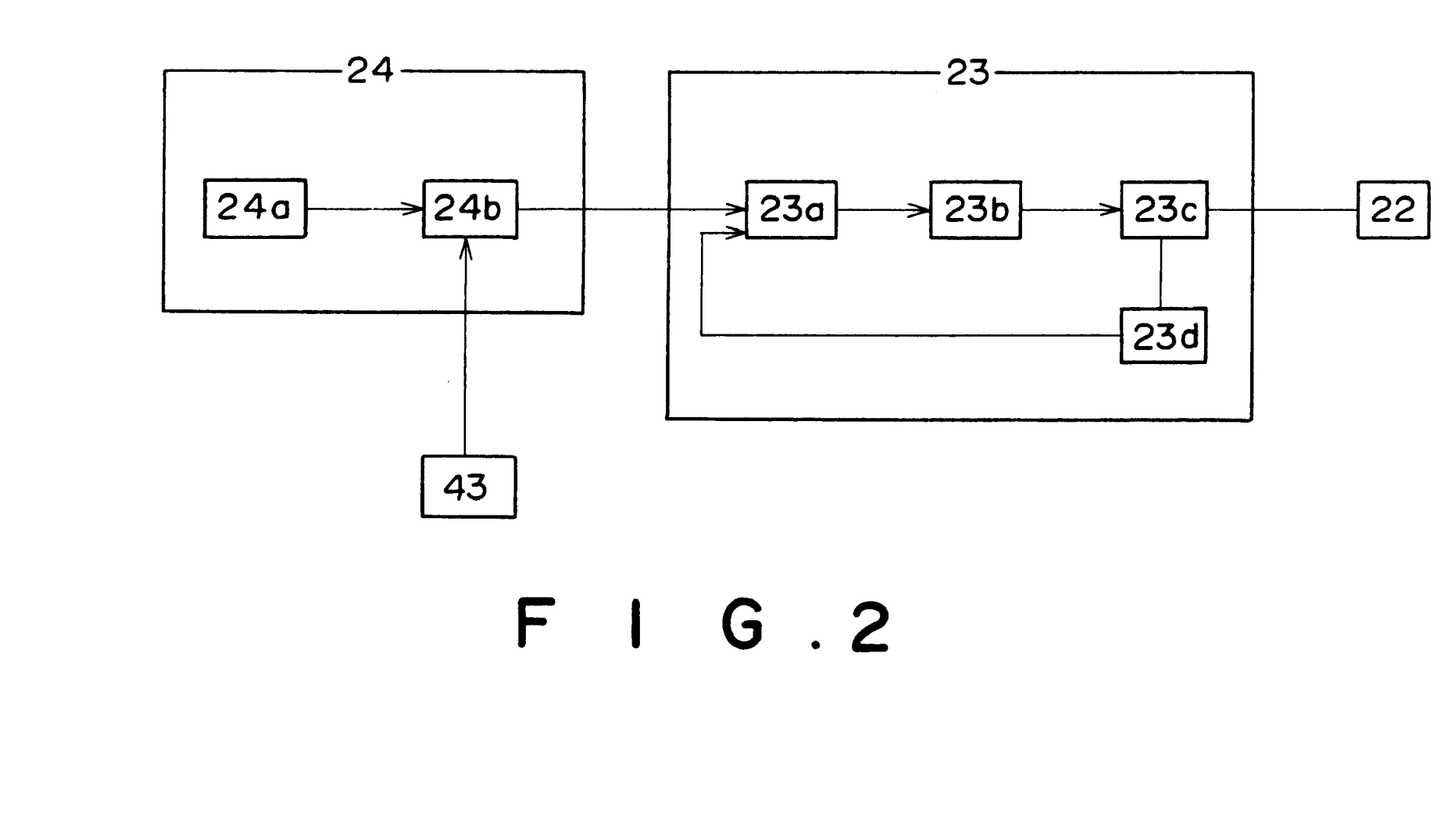
FIG. 2 is a block diagram showing the horizontal scan motor and the first clock generation means employed in the image reader shown in FIG. 1.

The first clock generation means 24, as shown in FIG. 2, is equipped with first reference-clock generation means 24a for generating a first reference clock pulse CH1 of higher frequency than the first clock pulse C1, and a first frequency-dividing circuit 24b, which has a variable frequency-dividing ratio, for dividing the frequency of the first reference clock pulse CH1 so that it becomes equal to the frequency of the first clock pulse C1. The second clock generation means 29, as with the first clock generation means 24, is constructed of second reference-clock generation means and a second frequency-dividing circuit. Since the second clock generation means 29 is similar in construction to the first clock generation means 24, a description thereof is omitted. The drive-clock control means 43 is used for adjusting the first clock pulse C1 and the second clock pulse C2 by adjusting the frequency-dividing ratio of the first frequency-dividing circuit 24 and the frequency-dividing ratio of the second frequency-dividing circuit (not shown).

The horizontal scan motor 23, as shown in FIG. 2, is constructed of a motor main body 23c, an encoder 23d provided to be coaxial with motor main body 23c, a drive circuit 23c for driving the motor main body 23c, and a phase-locked loop (PLL) circuit 23a for performing feedback control on the basis of the output of the encoder 23a, while controlling the speed of the drive circuit 23b by the first clock pulse C1 obtained by the first frequency-dividing circuit 24b. The vertical scan motor 28 is similar in construction to the horizontal scan motor 23, so a description thereof is omitted.

Now, the operation of the light-beam scanning type image reader 100 in this embodiment will be described in detail.

First, for example, at the start-up, etc., of the reader 100, reading of a radiation image is performed by use of the calibration sheet 10'. This calibration sheet 10' is fabricated in the same size as the sheet 10 from which a radiation image is read out by the reader 100, and is a sheet on which a uniform radiation image has been stored and recorded by irradiation of uniform radiation.

The calibration sheet 10' is placed at a predetermined position on the conveyor belt 27, as with the normal case of reading the sheet 10.

The laser beam L is emitted from the light source 21 and reflected and deflected by the rotating polygon mirror 22 being rotated in the direction of arrow K by the horizontal scan motor 23. The deflected laser beam L is focused and reflected by the fθ lens 25 and the reflecting mirror 26 and is scanned on the calibration sheet 10' in the direction of arrow X at uniform speed.

The speed of the horizontal scan is determined by the first clock pulse C1 obtained by dividing the frequency of the first reference clock pulse CH1, generated by the first reference-clock generation means 24a, by the frequency-dividing ratio of the default of the first frequency-dividing circuit 24b.

The laser beam L is horizontally scanned on the sheet 10' over a longer range than the length in the horizontal scanning direction of the sheet 10'. While the laser beam L is being scanned on the sheet 10' in the range of this horizontal scan, photostimulated fluorescent light M is emitted according to the radiation image recorded on the sheet 10' and sequentially guided to the PMT 32 by the optical guide 30.

Figure 3:
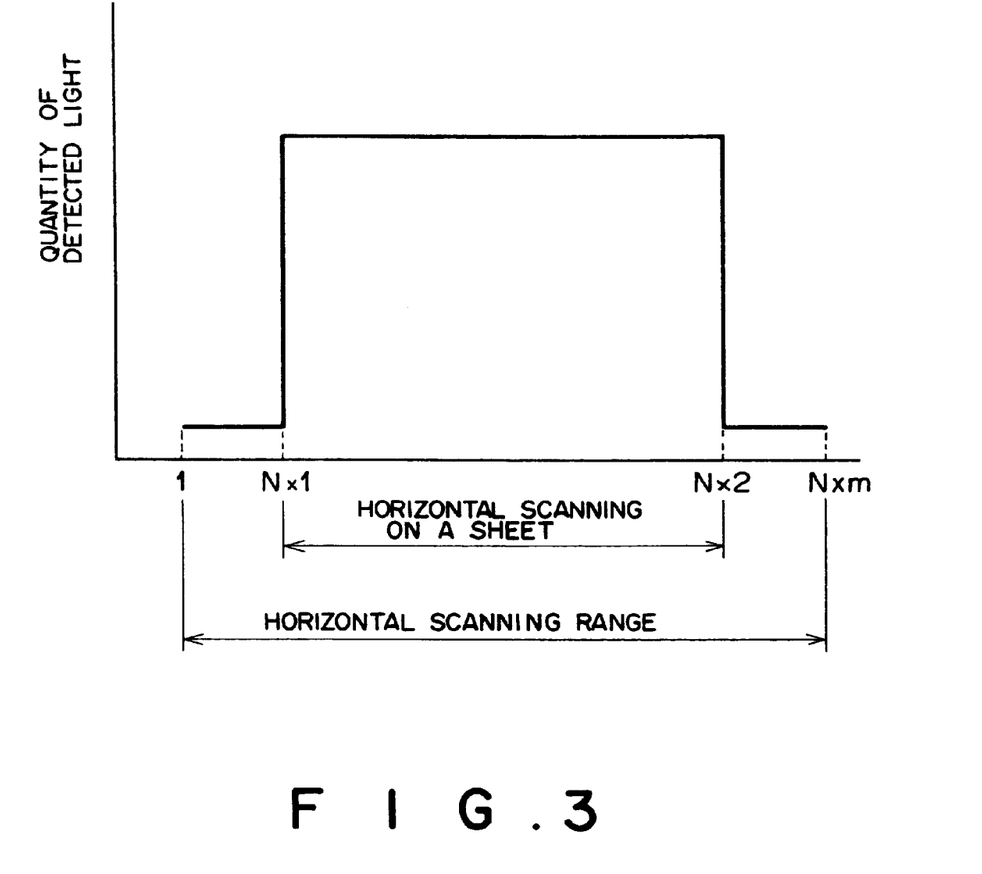
FIG. 3 is a graph showing a light-quantity distribution detected over a horizontal scanning range.

Since the radiation image on the calibration sheet 10' is recorded by uniform radiation, as previously described, the relationship between the horizontal scanning position of the laser beam L and the quantity of the photostimulated fluorescent light M emitted is roughly obtained as shown in FIG. 3. That is, during the time the laser light L is being scanned on the sheet 10', an approximately constant quantity of photostimulated fluorescent light M is emitted. During the time the laser light L is being scanned on a portion out of the sheet 10', no photostimulated fluorescent light is emitted and only the laser beam L is reflected at the conveyor belt 27. The reflected laser beam is prevented from entering the PMT 31, by providing a laser light cut filter, which allows the photostimulated fluorescent light M to pass through and interrupt passage of the laser beam L, on the light-incidence end face or light-emergence end face (connected with the PMT 31) of the optical guide 30.

The light quantities thus detected all over the horizontal scanning range by the PMT 31 are represented, for example, by a distribution such as the one shown in FIG. 3.

The PMT 31 photoelectrically converts the detected fluorescent light M to an electrical image signal S. The image signal S is input to the A/D converter 32. The A/D converter 32 converts the image signal S to a digital signal D in response to the sampling clock pulse C3 generated by the sampling-clock generation means 33. That is, sampling is performed all over the horizontal scanning range having, for example, a pixel number Nxm, as shown in FIG. 3.

The digital signal D obtained by the A/D converter 32 is input to the clock-cycle computation means 41. The clock-cycle computation means 41 computes the number of digital signals D (horizontal pixel number Nx) input during the time the laser beam L is being scanned on the sheet 10' in the horizontal scanning direction. This computation is done by counting the number of digital signals D whose value is higher than a predetermined threshold value, after detection of the photostimulated fluorescent light M. That is, in FIG. 3 the digital signal D higher than the predetermined value ranges from the Nx1-st pixel to the Nx2-nd pixel, so the horizontal pixel number Nx is calculated by Nx=(Nx2−(Nx1−1)).

The clock-cycle computation means 41 computes the first frequency-dividing ratio, which determines the horizontal scanning speed, so that the computed horizontal pixel number Nx becomes equal to a desired pixel number Nx0, and outputs the obtained frequency-dividing ratio to the clock-cycle storage means 42.

During the aforementioned horizontal scan, the conveyor belt 27 is moved in the direction of arrow Y at a constant speed corresponding to the cycle of the second clock pulse C2, by the vertical scan motor 28 whose speed of rotation is determined by the second clock pulse C2. With this movement, the sheet 10' placed on the belt 27, along with the belt 27, is scanned in the direction of arrow Y.

If the aforementioned repetition of horizontal scan, and the vertical scan are completed, the clock-cycle computation means 41 performs computation of a vertical pixel number Ny and computation of a second frequency-dividing ratio based on the computed vertical pixel number Ny, for the vertical scanning direction, as with the computation of the horizontal pixel number Nx and the computation of the first frequency-dividing ratio based on the computed horizontal pixel number Nx, performed for the horizontal scanning direction. The obtained second frequency-dividing ratio is stored in the clock-cycle storage means 42.

With the foregoing operation, the operation of reading the calibration sheet 10' ends.

Subsequently, the sheet 10 from which a radiation image is read out is placed on the conveyor belt 27, and reading is performed, as in the case of the calibration sheet 10'. In the case of the sheet 10, the drive-clock control means 43 reads out the first frequency-dividing ratio and second driving ratio stored in the clock-cycle storage means 42, and controls the first frequency-dividing circuit 24b so that frequency dividing is performed with the first frequency-dividing ratio, and also controls the second frequency-dividing circuit (not shown) so that frequency dividing is performed with the second frequency-dividing ratio.

With the foregoing operation, the horizontal scanning speed of the laser beam L with respect to the sheet 10 is controlled so that the horizontal pixel number Nx becomes equal to the desired pixel number Nx0, and the vertical scanning speed of the laser beam L with respect to the sheet 10 is controlled so that the vertical pixel number Ny becomes equal to the desired pixel number Ny0.

Thus, according to the light-beam scanning type image reader 100 of this embodiment, image signals of a desired number of pixels can be readily obtained in both the horizontal scanning direction and the vertical scanning direction.

While it has been described in this embodiment that the clock-frequency computation means 41 computes the number of pixels during scanning of the sheet 10' by counting the number of digital signals D which are of a higher range than the predetermined threshold value, the present invention is not limited to this embodiment. For example, the number of pixels during scanning of the sheet 10' may be computed by computing an average value Dav of the digital signals for the central portion in the horizontal scanning range (the same is true of the vertical scanning direction) and counting the number of digital signals D which are higher than a threshold value which is, for example, two-thirds of the average value Dav. Also, the number of pixels may be simply computed between the maximum of the differential coefficient of the digital signal D in the horizontal or vertical scanning direction and the minimum.

Figure 4:
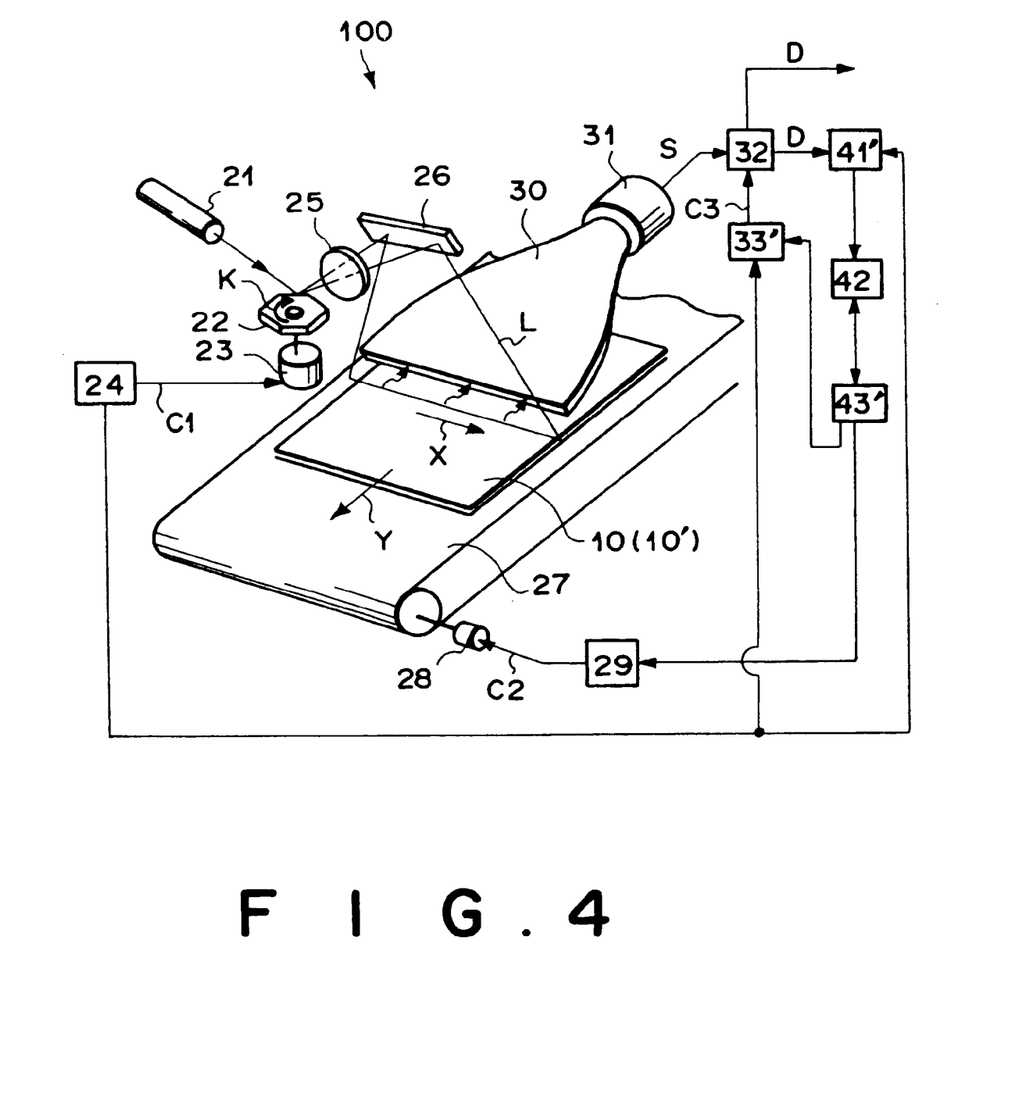
FIG. 4 is a schematic diagram showing an embodiment of a second light-beam scanning type image reader of the present invention.

FIG. 4 illustrates an embodiment of a second light-beam scanning type image reader 100 of the present invention. The second light-beam scanning type image reader 100 differs from the light-beam scanning type image reader shown in FIG. 1 in that instead of adjusting the first clock pulse C1 of first clock generation means 24, the sampling clock pulse C3 of sampling-clock generation means 33' is adjusted.

That is, drive-clock control means 43' in this embodiment controls the sampling clock pulse C3 of the sampling-clock generation means 33', not the first clock pulse C1 of the first clock generation means 24.

The sampling-clock generation means 33' operates as a frequency-dividing circuit for dividing the frequency of the first reference clock CH1 generated from the first reference-clock generation means 24a (see FIG. 2) of the first clock generation means 24. Clock-frequency computation means 41' operates by computing a frequency-dividing ratio that is used by the sampling-clock generation means 33'.

More specifically, the clock-frequency computation means 41' computes a third frequency-dividing ratio, which is used in the sampling-clock generation means 33', so that a pixel number Nx in the horizontal scanning direction of a calibration sheet 10', obtained when reading of the sheet 10' is performed, becomes equal to a desired pixel number Nx0, and also computes a second frequency-dividing ratio so that a pixel number Ny in the vertical scanning direction of the sheet 10' becomes equal to a desired pixel number Ny0 by a sampling clock pulse based on the third frequency-dividing ratio.

The obtained third frequency-dividing ratio for the sampling-clock generation means 33' and the second frequency-dividing ratio for the second clock generation means 24 are stored in the clock-cycle storage means 42. When reading out a radiation image from the sheet 10, the drive-clock control means 43, reads out the frequency-dividing ratios stored in the clock-cycle storage means 42, and inputs them to the sampling-clock generation means 33' and the second clock generation means 24, respectively. With the two input frequency-dividing ratios, the sampling-clock generation means 33' and the second clock generation means 24 are controlled.

Thus, the light-beam scanning type image reader 100 shown in FIG. 4 is capable of easily obtaining image signals of a desired number of pixels in each of the horizontal and vertical scanning directions.

Figure 5:
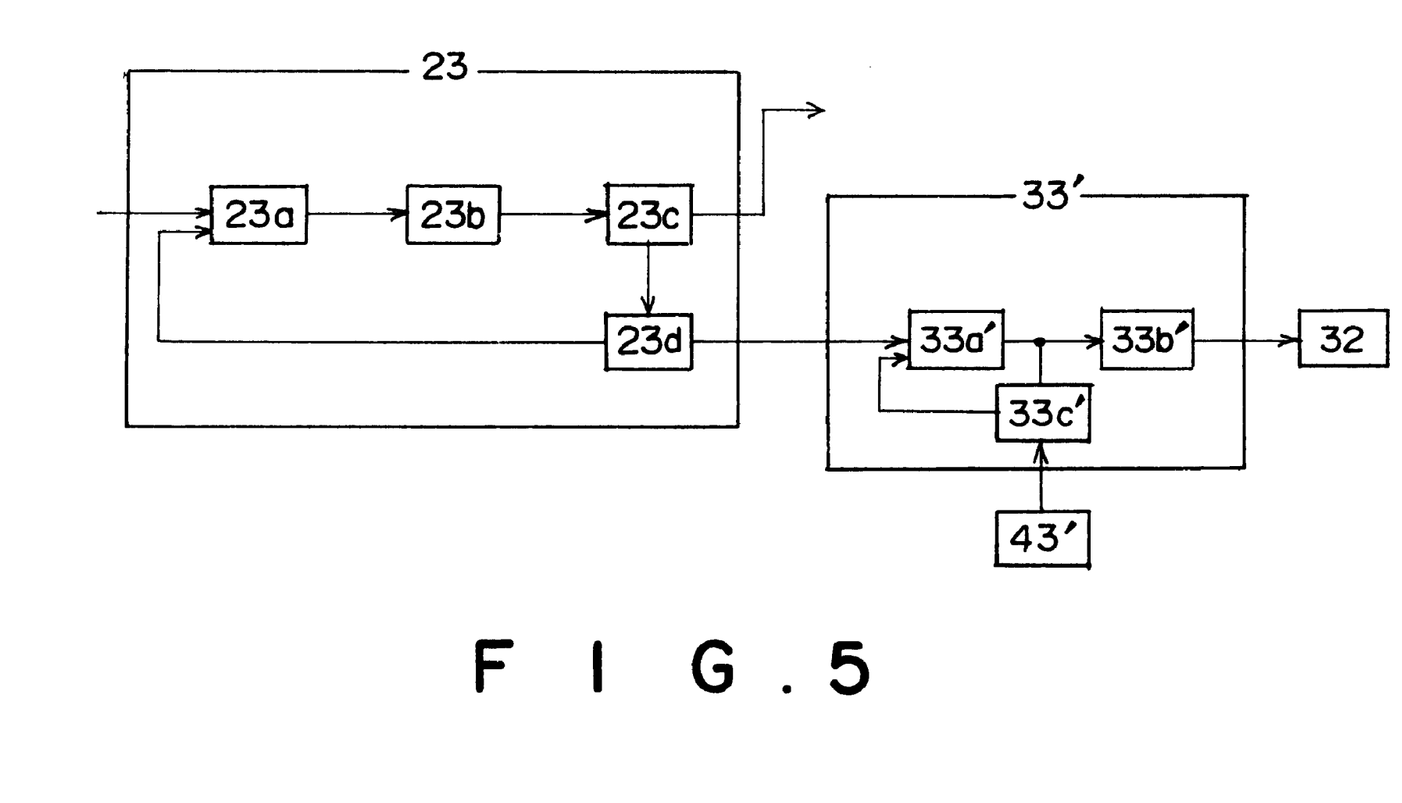
FIG. 5 is a block diagram showing the essential construction of another embodiment of the second light-beam scanning type image reader of the present invention.

Although it has been described in the embodiment of FIG. 4 that the sampling-clock generation means 33' operates as a frequency-dividing circuit for dividing the frequency of the first reference clock pulse CH1 generated from the first clock generation means 24a, the present invention is not limited to this embodiment. For instance, as shown in FIG. 5, the sampling-clock generation means 33, may be equipped with a PLL circuit 33a' for receiving a high-frequency pulse (which is generated, depending on the speed of rotation of the rotating polygon mirror) output from the encoder 23d of the horizontal scan motor 23, a frequency divider 33b' or dividing the frequency of the output clock of the PLL circuit 33a, and a frequency divider 33c' for dividing the frequency of a high-frequency clock pulse output by the drive-clock control means 43' from the encoder 23d' at a frequency-dividing ratio corresponding to the frequency-dividing ratio stored in the clock-frequency storage means 42. Thus, by employing the clock pulse, generated from the encoder 23d of the horizontal scan motor 23, as the original high-frequency clock pulse for obtaining an A/D sampling clock pulse by frequency dividing, even when there is a fluctuation in the speed of rotation of the horizontal scan motor, the A/D sampling clock pulse can properly follow the rotation fluctuation.

In addition, all of the contents of Japanese Patent Application No. 11(1999)-280130 are incorporated into this specification by reference.

What is claimed is:

1. A light-beam scanning type image reader comprising:
   light-beam generator which generates a light beam;
   first clock generator which generates a first clock pulse;
   second clock generator which generates a second clock pulse;
   a rotating polygon mirror, which rotates at a speed of rotation based on said first clock pulse generated by said first clock generator, for reflecting and deflecting said light beam so that said light beam is repeatedly scanned on a scan body in a horizontal scanning direction;
   vertical scanner which scans at least either one of said light beam or said scan body with respect to the other in a vertical scanning direction approximately perpendicular to said horizontal scanning direction at a speed based on said second clock pulse generated by said second clock generator;
   photoelectric detector which detects in sequence luminescent light emitted from said scan body by scanning said light beam on said scan body;
   sampling-clock generator which generates a fixed analog-to-digital (A/D) sampling clock pulse;

analog-to-digital converter which converts analog signals, detected and obtained by said photoelectric detector, to digital signals according to said A/D sampling clock pulse generated by said sampling-clock generator;

clock-cycle computer computes a cycle of said first clock pulse so that a number of said digital signals, obtained according to a horizontal length of a predetermined scan body, becomes equal to a first desired number of pixels, and for computing a cycle of said second clock pulse so that a number of said digital signals, obtained according to a vertical length of said predetermined scan body, becomes equal to a second desired number of pixels;

clock-cycle storage which stores the cycle of said first clock pulse and the cycle of said second clock pulse computed by said clock-cycle computer; and drive-clock controller which adjusts a cycle of said first clock pulse and a cycle of said second clock pulse, based on the cycle of said first clock pulse and the cycle of said second clock pulse stored in said clock-cycle storage.

2. The light-beam scanning type image reader as set forth in claim 1, wherein said first clock generator is equipped with first reference-clock generator which generates a first reference clock pulse which is higher in frequency than said first clock pulse, and a first frequency-dividing circuit, which has a variable frequency-dividing ratio, for dividing frequency of said first reference clock pulse so that the frequency of said first reference clock pulse becomes equal to the frequency of said first clock pulse;

said second clock generator is equipped with second reference-clock generator generates a second reference clock pulse which is higher in frequency than said second clock pulse, and a second frequency-dividing circuit, which has a variable frequency-dividing ratio, for dividing frequency of said second reference clock pulse so that the frequency of said second reference clock pulse becomes equal to the frequency of said second clock pulse; and said drive-clock controller adjusts said first clock pulse and said second clock pulse by adjusting said frequency-dividing ratios of said first frequency-dividing circuit and said second frequency-dividing circuit.

3. A light-beam scanning type image reader comprising:

light-beam generator which generates a light beam;

first clock generator which generates a first clock pulse;

second clock generator which generates a second clock pulse;

a rotating polygon mirror, which rotates at a speed of rotation based on said first clock pulse generated by said first clock generator, for reflecting and deflecting said light beam so that said light beam is repeatedly scanned on a scan body in a horizontal scanning direction;

vertical scanner which scans at least either one of said light beam or said scan body with respect to the other in a vertical scanning direction approximately perpendicular to said horizontal scanning direction at a speed based on said second clock pulse generated by said second clock generator;

photoelectric detector which detects in sequence luminescent light emitted from said scan body by scanning said light beam on said scan body;

sampling-clock generator which generates an A/D sampling clock pulse;

analog-to-digital converter which converts analog signals, detected and obtained by said photoelectric detector, to digital signals according to said A/D sampling clock pulse generated by said sampling-clock generator;

clock-cycle computer which computes a cycle of said A/D sampling clock pulse so that a number of said digital signals, obtained according to a horizontal length of a predetermined scan body, becomes equal to a first desired number of pixels, and for computing a cycle of said second clock pulse so that a number of said digital signals, obtained based on said A/D sampling clock pulse after said cycle has been adjusted according to a vertical length of said predetermined scan body, becomes equal to a second desired number of pixels;

clock-cycle storage which stores the cycle of said A/D sampling clock pulse and the cycle of said second clock pulse computed by said clock-cycle computer; and drive-clock controller which adjusts a cycle of said A/D sampling clock pulse and a cycle of said second clock pulse, based on the cycle of said A/D sampling clock pulse and the cycle of said second clock pulse stored in said clock-cycle storage.

4. The light-beam scanning type image reader as set forth in claim 3, wherein said sampling-clock generator which is equipped with first reference-clock generator which generates a first reference clock pulse which is higher in frequency than said A/D sampling clock pulse, and a first frequency-dividing circuit, which has a variable frequency-dividing ratio, for dividing frequency of said first reference clock pulse so that the frequency of said first reference clock pulse becomes equal to the frequency of said A/D sampling clock pulse;

said second clock generator is equipped with second reference-clock generator which generates a second reference clock pulse which is higher in frequency than said second clock pulse, and a second frequency-dividing circuit, which has a variable frequency-dividing ratio, for dividing frequency of said second reference clock pulse so that the frequency of said second reference clock pulse becomes equal to the frequency of said second clock pulse; and said drive-clock controller adjusts said A/D sampling clock pulse and said second clock pulse by adjusting said frequency-dividing ratios of said first frequency-dividing circuit and said second frequency-dividing circuit.

5. The light-beam scanning type image reader as set forth in claim 3, wherein said sampling-clock generator is equipped with a first frequency-dividing circuit, which has a variable frequency-dividing ratio, for dividing frequency of a clock pulse, generated by following rotation of said rotating polygon mirror, which is higher in frequency than said A/D sampling clock pulse, so that the frequency of said clock pulse becomes equal to the frequency of said A/D sampling clock pulse;

said second clock generator is equipped with second reference-clock generator which generates a fixed second reference clock pulse which is higher in frequency than said second clock pulse, and a second frequency-dividing circuit, which has a variable frequency-dividing ratio, for dividing frequency of said second reference clock pulse so that the frequency of said second reference clock pulse becomes equal to the frequency of said second clock pulse; and said drive-clock controller adjusts said A/D sampling clock pulse and said second clock pulse by adjusting said frequency-dividing ratios of said first frequency-dividing circuit and said second frequency-dividing circuit.

6. The light-beam scanning type image reader as set forth in claim 1, wherein said clock-frequency computer computes each of the numbers of digital signals corresponding to the horizontal and vertical lengths of said predetermined scan body, based on a value of said digital signal obtained.

7. The light-beam scanning type image reader as set forth in claim 2, wherein said clock-frequency computer computes each of the numbers of digital signals corresponding to the horizontal and vertical lengths of said predetermined scan body, based on a value of said digital signal obtained.

8. The light-beam scanning type image reader as set forth in claim 3, wherein said clock-frequency computer computes each of the numbers of digital signals corresponding to the horizontal and vertical lengths of said predetermined scan body, based on a value of said digital signal obtained.

9. The light-beam scanning type image reader as set forth in claim 4, wherein said clock-frequency computer computes each of the numbers of digital signals corresponding to the horizontal and vertical lengths of said predetermined scan body, based on a value of said digital signal obtained.

10. The light-beam scanning type image reader as set forth in claim 5, wherein said clock-frequency computer computes each of the numbers of digital signals corresponding to the horizontal and vertical lengths of said predetermined scan body, based on a value of said digital signal obtained.

* * * * *